US012545502B2

(12) United States Patent
Jebsen

(10) Patent No.: US 12,545,502 B2
(45) Date of Patent: Feb. 10, 2026

(54) RECYCLING SYSTEM FOR THE UTILIZATION OF REUSABLE OBJECTS

(71) Applicant: 1less GmbH, Berlin (DE)

(72) Inventor: Boris Jebsen, Berlin (DE)

(73) Assignee: 1 less GmbH (DE)

( * ) Notice: Subject to any disclaimer, the term of this patent is extended or adjusted under 35 U.S.C. 154(b) by 70 days.

(21) Appl. No.: 17/806,034

(22) Filed: Jun. 8, 2022

(65) Prior Publication Data

US 2022/0297931 A1 Sep. 22, 2022

Related U.S. Application Data

(63) Continuation of application No. PCT/EP2020/085244, filed on Dec. 9, 2020.

(30) Foreign Application Priority Data

Dec. 9, 2019 (EP) .................................... 19214513

(51) Int. Cl.
*B65F 1/00* (2006.01)
*A47G 19/08* (2006.01)
(Continued)

(52) U.S. Cl.
CPC ............ *B65F 1/006* (2013.01); *B07C 5/3412* (2013.01); *B07C 5/362* (2013.01); *B65F 1/1607* (2013.01); *A47G 19/08* (2013.01); *B07C 2501/0054* (2013.01); *B65F 2001/008* (2013.01); *B65F 2210/138* (2013.01); *B65F 2210/168* (2013.01); *B65F 2210/176* (2013.01); *B65F 2210/184* (2013.01)

(58) Field of Classification Search
CPC .............. B65F 1/1607; B65F 2001/008; B65F 2210/112; B65F 2210/168; B07C 5/3412
USPC .......................................................... 209/524
See application file for complete search history.

(56) References Cited

U.S. PATENT DOCUMENTS 5,826,789 A * 10/1998 Decaux .................. B65F 1/006
232/43.2
6,817,462 B1 * 11/2004 Salda ................... G07F 7/0609
209/919
(Continued)

FOREIGN PATENT DOCUMENTS

CN 107804609 A 3/2018
CN 110077749 A 8/2019
(Continued)

OTHER PUBLICATIONS

"International Search Report and Written Opinion" mailed on Jun. 17, 2021 for PCT Application No. PCT/EP2020/085244, 21 pages.

*Primary Examiner* — Molly K Devine
(74) *Attorney, Agent, or Firm* — PERKINS COIE LLP; Colin Fowler

(57) ABSTRACT

A recycling system for recycling reusable objects comprises one or more separating and receiving apparatuses and at least one recyclable object. The separating and receiving apparatus for separating reusable objects and residual waste comprises: a first receiving container for receiving residual waste; a second receiving container for receiving labeled objects; and a sorting device. The sorting device is designed to detect labeled objects, transfer detected objects to the second receiving container, and transfer other objects to the first receiving container.

7 Claims, 5 Drawing Sheets

(51) Int. Cl.
*B07C 5/34* (2006.01)
*B07C 5/36* (2006.01)
*B65F 1/16* (2006.01)

(56) References Cited

U.S. PATENT DOCUMENTS

| | | | | |
|---|---|---|---|---|
| 7,454,358 | B2 * | 11/2008 | Mallett | A61B 50/36 209/702 |
| 9,296,018 | B2 * | 3/2016 | Gomez | B30B 9/3039 209/522 |
| 2004/0133484 | A1 * | 7/2004 | Kreiner | B07C 5/3412 705/28 |
| 2005/0087255 | A1 | 4/2005 | Humphrey et al. | |
| 2017/0011580 | A1 * | 1/2017 | Huang | G06Q 30/0631 |

FOREIGN PATENT DOCUMENTS

| | | | | |
|---|---|---|---|---|
| DE | 202015000449 | U1 | 2/2015 | |
| DE | 102016123593 | A1 | 6/2018 | |
| DE | 202019103055 | U1 | 6/2019 | |
| WO | WO-9930292 | A1 * | 6/1999 | B07C 5/122 |
| WO | 2021116161 | A1 | 6/2021 | |

* cited by examiner

RECYCLING SYSTEM FOR THE UTILIZATION OF REUSABLE OBJECTS

This application is a continuation of International Application No. PCT/EP2020/085244, filed Dec. 9, 2020, which claims the benefit of priority to European Application No. 19214513.4, filed Dec. 9, 2019, each of which is incorporated by reference herein in its entirety.

TECHNICAL FIELD

The present invention relates to a recycling system for using reusable objects, in particular recyclable tableware (reusable tableware), and to a separating and receiving device, in particular a smart waste container, for automatically sorting out the recyclable objects. The invention further relates to recyclable objects, in particular reusable tableware, for use in said system. In addition, the invention relates to a separating and receiving apparatus, in particular a smart waste container, for automatically separating residual waste and recyclable objects, in particular reusable tableware.

BACKGROUND

In Germany alone, 2.8 billion disposable coffee cups are currently thrown away each year after an average of around 4 minutes of use. Many of these coffee cups are also fitted with plastic lids, which are then also thrown away together with the cup after a single use. Disposable tableware such as dinner plates, disposable forks and knives, disposable chopsticks and the like are often used, in particular at large events—for example trade show companies, open-air events or sporting events.

Deposit-free systems for reusing/recycling used tableware have so far only been designed for very limited numbers of users. The use of reusable tableware for large events requires far more effort. For larger numbers of users, deposit-based systems are generally used, but these are not very flexible in relation to the usage habits of the end customers.

As an example, consider the situation of a typical trade show visitor: The visitor buys a coffee in a deposit-based cup or mug in Hall 1, for example. While drinking the coffee, the visitor continues to move through the trade show event and is already in Hall 2 when the cup or mug is emptied. In typical deposit systems, the trade show visitor must now either (i) search for and find another vending booth of the trade show vendor or external vendor, line up there, return the cup/mug and receive his/her deposit, (ii) walk back to Hall 1 to return the cup there if the visitor cannot find another stand, or (iii) give up the deposit and throw the cup/mug into a normal waste container, thus removing the tableware from the deposit system and turning it into residual waste.

However, this system is very inefficient for the following reasons:

- The trade show visitor's time is valuable and is wasted returning the tableware.
- International trade show visitors prefer to use credit cards and have no use for the returned deposit money.
- External exhibitors at trade shows do not want to be burdened with return infrastructures.
- Sales outlets set up for the trade show lose sales if they have to spend additional time on taking back reusable objects.

The same or similar arguments apply to other large events and enclosed areas such as open-air concerts and festivals, amusement parks, zoos, airports or large corporations.

However, if reusable tableware were to be handed out at such events without a deposit and special waste containers were set up for the return of the reusable tableware, for example, many visitors would ignore the waste containers in the hectic pace of the event or even out of disinterest and simply dispose of the tableware in waste containers for normal residual waste, which in turn would remove the tableware from the deposit system and turn it into residual waste. In addition, this also means a loss for the provider since reusable tableware is usually more expensive than disposable tableware and the return of a significant portion of the reusable tableware is budgeted for.

Therefore, there is a need for a deposit-free system for reusing/recycling used reusable tableware that is in particular suitable for use at large events.

It is therefore the object of the present invention to provide a deposit-free system for reusing/recycling reusable objects, in particular reusable tableware, by means of which in particular the above-described disadvantages can be avoided. A further object of the present invention is to provide suitable components for use in this system.

BRIEF DESCRIPTION OF THE DRAWINGS

The invention is described in detail below on the basis of exemplary embodiments and with reference to the following drawings.

DETAILED DESCRIPTION

Figure 1:
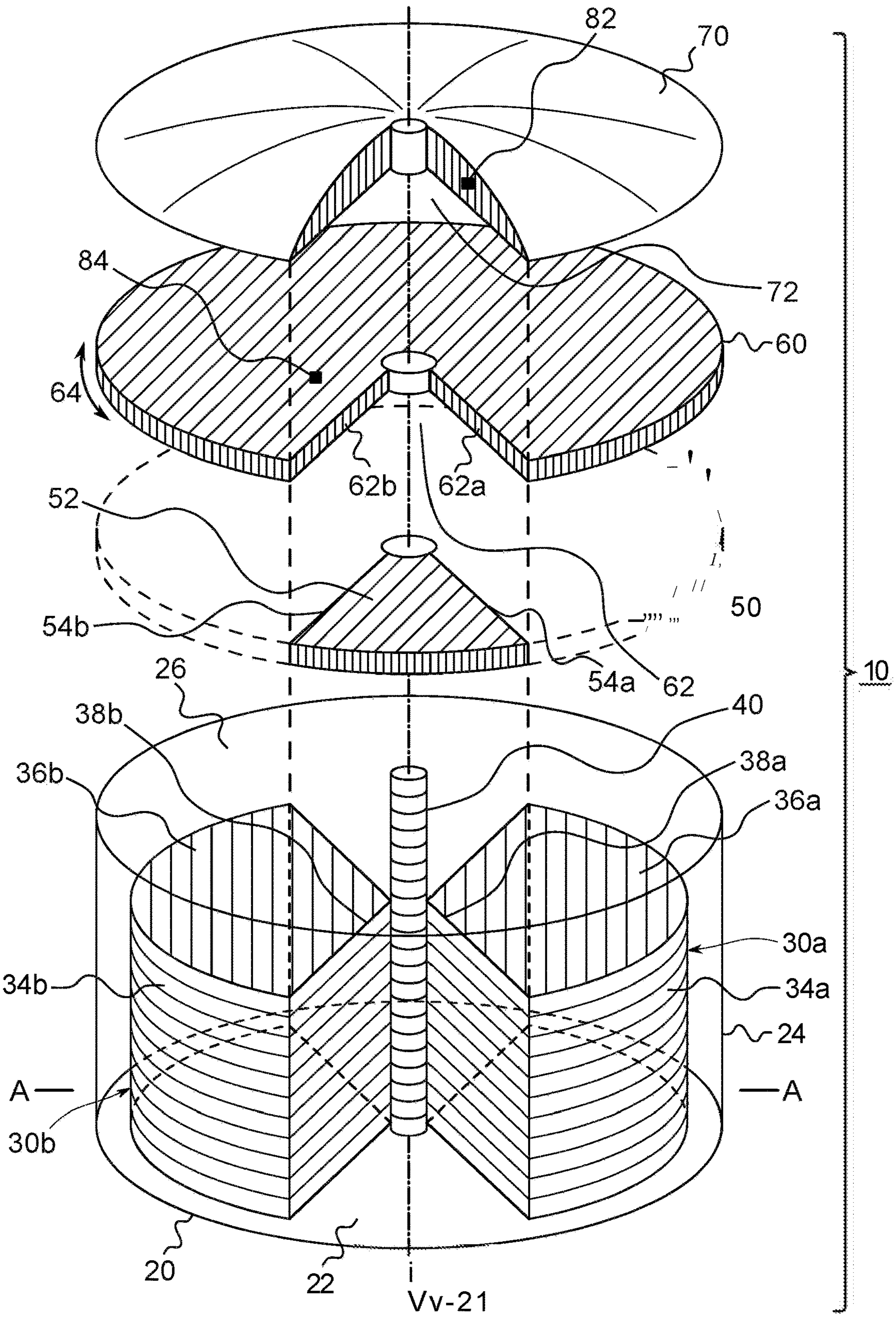
FIG. 1 schematically illustrates an embodiment of the waste container according to the invention in an exploded view.

In the following, preferred embodiments and features of the present invention are described in more detail with reference to the accompanying drawings, in which exemplary embodiments of the invention are shown. In the drawings, the same reference numerals refer to like elements. Conversely, however, the same corresponding elements in different drawings may have different reference numerals if a passage of the description is intended to refer to a very specific figure. Redundant descriptions are omitted. The term "and/or" as used herein includes any and all combinations of one or more of the associated listed elements. Furthermore, the use of "can" when describing embodiments of the present invention refers to "one or more embodiments of the present invention."

It is understood that expressions such as "first" and "second" are used to describe different elements, but these elements are not restricted by these expressions. These expressions are used only to distinguish one element from another element. For example, a first element may be referred to as a second element, and similarly, a second element may be referred to as a first element, without departing from the scope of protection of the present invention.

In the following description of embodiments of the present invention, the use of the singular may also include the plural unless the context clearly indicates otherwise.

Relative expressions for describing spatial relationships such as “below”, “bottom”, “above”, “top”, “spaced” and the like may be used below to simplify the description; the spatial relationship of an element or feature to another element or feature is then to be understood as shown in the drawings. If one or more coordinate system(s) is/are included in a figure, relative expressions may also refer to a coordinate system; again, this is generally explicitly indicated in the relevant passage of the description. It is understood that the spatially relative expressions are intended to include various orientations of the apparatus used, in addition to the orientation shown in the drawings. For example, if an apparatus illustrated in the drawings (and, at the same time, each of the coordinate systems indicated therein, if applicable) is inverted, elements described as being “below” other elements or features would consequently be positioned “above” the other elements or features. The apparatus can be oriented in another way (e.g., rotated 90° or in other orientations); in this case, the prepositions used to describe spatial relations are to be reinterpreted accordingly.

It is also understood that, when a first element or a first layer is described as being “attached to” a second element or a second layer, the first layer or the first element may be attached directly to the second element or may be attached to the second element or the second layer by means of one or more further intermediate elements or layers. Furthermore, it is also understood that, when an element or a layer is described as being “between” two other elements or layers, said element or layer may be the only element or layer between the two other elements or layers, or there may be one or more further intermediate elements or layers.

The recycling system according to the invention for the utilization of reusable objects enables the automatic separation of reusable tableware into “residual waste” and reusable useful objects (“reusable”). After cleaning on site (preferably within industrial washing lines), the reusable objects re-enter the usage cycle of trade fair companies, festivals, amusement parks, zoos and similar self-contained events, in particular large-scale events.

The distinguishing feature of the recycling system according to the invention is the possibility of utilizing reusable objects, in particular reusable tableware, without a deposit at (large-scale) events, in particular in enclosed areas.

The return process is as follows, by way of example: The “smart” waste containers according to embodiments of the invention are distributed throughout the area. Visitors buy their drinks and food on the premises in reusable containers or disposable containers individually branded with cardboard sleeves and throw their unsorted waste into the “smart” waste containers. There, the waste is automatically separated immediately after it is deposited. This process means that the visitors do not lose time queuing unnecessarily at return stations, they do not have to spend and take back “deposit money”, and foreign visitors, who may only use credit cards, do not have to handle deposit money that is essentially “worthless” to them. Moreover, the sales stations on the premises can also use 100% of their time to sell, instead of wasting some of it on taking back deposit-based tableware and thus losing sales.

Advantageously, at the monitored entrances and exits of the entire premises, there are special RFID scanners (similar to those used in retail stores), which scan any reusable containers that have not yet been returned and which send a signal to the service staff on site. The staff then asks the visitors to throw any reusable containers that they may still have into the waste containers provided at the exits. This ensures an almost 100% return rate of the reusable tableware.

As an additional or alternative expansion stage of the recycling system, reverse vending machines can be installed. These machines do not have a sorting function, but instead scan reusable tableware when it is deposited, collect the tableware in a container (for non-RFID tableware, the depositing chute remains closed) and credit the user with a predefined deposit on a credit chip card. The user can then redeem the deposit, for example, at participating companies from the fast-food and catering sectors, coffee chains or supermarkets. In this way, the system is transformed from a reuse system that is deposit-free to one that can also be used with a deposit and in open areas. The vending machine transmits its current fill level to a central web server, and the operators see to regular emptying, cleaning, and supplying reusable tableware, such as coffee cups or food bowls.

Overview

One aspect of the invention relates to a separating apparatus, in particular a smart waste container, for separating and receiving reusable objects and residual waste. The separating apparatus can be in particular a waste container, particularly preferably a smart waste container. The separating apparatus comprises: a first receiving container for receiving residual waste; a second receiving container for receiving labeled objects; and a sorting device. The sorting device is designed to detect labeled objects. The sorting device is further designed to transfer detected objects to the second receiving container and to transfer other objects to the first receiving container.

Preferably, a separating apparatus according to the invention is understood to be a separating and receiving apparatus, in particular a smart waste container, for separating and receiving reusable objects and residual waste.

In one embodiment, the separating apparatus further comprises an outer container which, in relation to a virtual longitudinal axis thereof, has a bottom surface transverse to the longitudinal axis, a circumferential surface arranged about the longitudinal axis, and an opening located opposite the bottom surface of the outer container. The first receiving container has a bottom surface, a circumferential surface, and an opening opposite the bottom surface of the first receiving container. The second receiving container has a bottom surface, a circumferential surface, and an opening opposite the bottom surface of the second receiving container. The first receiving container and the second receiving container are each arranged or arrangeable within the outer container such that the opening in the first receiving container and the opening in the second receiving container are each oriented toward the opening in the outer container, and the bottom surface of the first receiving container and the bottom surface of the second receiving container are each oriented toward the bottom surface of the outer container.

In one embodiment, the separating apparatus further comprises a collector. The collector is arranged, in the direction of the longitudinal axis, between the openings in the receiving containers and the opening in the outer container. The collector comprises a planar segment, the segment extending transversely to the longitudinal direction and being located between the opening in the first receiving container and the opening in the second receiving container, as viewed from the bottom surface of the outer container towards the opening in the outer container.

In one embodiment, the separating apparatus further comprises a separating disk. The separating disk is arranged, in the direction of the longitudinal axis, between the collector and the opening in the outer container. The separating disk is arranged transversely to the longitudinal axis and is rotatably mounted about the longitudinal axis, wherein the separating disk has a cut-out, the shape of which, as viewed in the direction of the longitudinal axis, is completely coverable by the shape of the segment. Coverable means that, in projection along the longitudinal direction, the shape of the cut-out is congruent with the shape of the segment or can be inscribed in the shape of the segment.

In one embodiment, the separating apparatus comprises at least one movement sensor. The at least one movement sensor is designed (in particular positioned) to detect a movement in a first predefined region and, upon detecting a movement in the first predefined region, to transmit a movement signal to a control electronics system. The first predefined region, as viewed from the bottom surface of the outer container toward the opening in the outer container, is located behind the segment of the collector.

In one embodiment, the separating apparatus further comprises at least one RFID scanner. The at least one RFID scanner is designed (in particular positioned) to detect RFID signals from a second predefined region, to read the RFID identifier of the RFID signal, to compare the RFID identifier with a set of predefined RFID identifiers, and, upon detecting an RFID identifier corresponding to one in the set of predefined RFID identifiers, to transmit a detection signal to the control electronics system. The second predefined region, as viewed from the bottom surface of the outer container toward the opening in the outer container, is located behind the segment of the collector.

In one embodiment, the separating apparatus further comprises a control electronics system for controlling a motor. The control electronics system is designed to receive a movement signal from the movement sensor and to receive a detection signal from the RFID scanner. Furthermore, the control electronics system is designed to determine whether a time difference between the reception of a movement signal and the reception of a detection signal is smaller than a predefined threshold value (in the absence of a detection signal, the threshold value is exceeded). Furthermore, the control electronics system is designed, when a movement signal is received and it is determined that the time difference has exceeded the threshold, to transmit a first control signal and then a second control signal to the motor, and is designed, when a movement signal is received and it is determined that the time difference has not exceeded the threshold, to transmit a third control signal and then a fourth control signal to the motor.

In one embodiment, the separating apparatus further comprises a motor. The motor is designed to rotate the separating disk from an initial position in a first direction of rotation about the longitudinal axis upon receiving the first control signal from the control electronics system, to rotate the separating disk back to the initial position upon receiving the second control signal, to rotate the separating disk from the initial position in a second direction of rotation upon receiving the third control signal from the control electronics system, the second direction of rotation being opposite the first direction of rotation, and to rotate the separating disk back to the initial position upon receiving the fourth control signal. The initial position is determined by the cut-out in the separating disk being located above the segment of the collector, as viewed along the longitudinal axis from the bottom surface of the outer container toward the opening in the outer container. Furthermore, the first direction of rotation is determined by the cut-out in the separating disk moving toward the opening in the first receiving container.

In one embodiment, the separating apparatus further comprises a cover or a hood having a depositing chute. The opening in the outer container is closed or closable by means of the cover. When the outer container is closed by means of the cover, the depositing chute, as viewed from the bottom surface of the outer container toward the opening in the outer container, extends behind the segment of the collector. At least one of the movement sensors can be arranged in the depositing chute. The first predefined region can include at least the interior of the depositing chute.

In one embodiment of the separating apparatus, at least one RFID scanner is arranged in the depositing chute.

In one embodiment of the separating apparatus, the second predefined region comprises at least the interior of the depositing chute.

In one embodiment of the separating apparatus, at least one RFID scanner is arranged on or in the separating disk.

In one embodiment of the separating apparatus, the second predefined region includes at least the region of the cut-out in the separating disk.

In one embodiment, the separating apparatus further comprises a hollow cylinder. The hollow cylinder is arranged around the longitudinal axis. The motor and/or the control device can be arranged within the hollow cylinder.

In a preferred embodiment, the separating apparatus further comprises a power supply.

In a particularly preferred embodiment, the power supply of the separating apparatus has a rechargeable battery. The rechargeable battery can be arranged within the hollow cylinder.

In a particularly preferred embodiment, the power supply of the separating apparatus has one or more solar panels. One or more of the solar panels can be arranged on the cover.

In one embodiment of the separating apparatus, the separating disk extends from the hollow cylinder up to a first portion of the inner wall of the outer container.

In one embodiment of the separating apparatus, the segment of the collector extends from the hollow cylinder up to a second portion of the inner wall of the outer container.

In a preferred embodiment of the separating apparatus, the separating disk has a first edge or edge region and a second edge or edge region at the transition to the cut-out (i.e., in the region where the separating disk adjoins the cut-out). The first edge or edge region and the second edge or edge region each extend from an inner region of the separating disk to an outer region of the separating disk (in other words, there is a virtual cylinder with the virtual longitudinal axis as the central axis such that both the first edge or edge region and the second edge or edge region passes through the virtual cylinder; the virtual cylinder is generally different from the above-described hollow cylinder described above). The first edge or edge region is separated from the second edge or edge region by a virtual plane, the plane extending through the cut-out and the virtual longitudinal axis extending within the virtual plane (in other words, the plane is spanned by the longitudinal axis and a virtual straight line which is perpendicular to the longitudinal axis and extends through the cut-out).

In one embodiment of the separating apparatus, the first edge or edge region and the second edge or edge region each extend between the hollow cylinder and the inner wall of the outer container. It is not necessary for the first and/or the second edge to touch the cylinder and/or the inner wall of the outer container.

In one embodiment of the separating apparatus, the first edge or edge region and the second edge or edge region each extend in the radial direction or are each aligned in the radial direction.

In one embodiment of the separating apparatus, a first sweeping lip is attached to the first edge or edge region and a second sweeping lip is attached to the second edge or edge region. The sweeping lips are in particular suitable for pushing waste or objects on the segment of the collector. The sweeping lips can also protrude from the separating disk in the direction leading away from the collector.

In one embodiment of the separating apparatus, the first sweeping lip and the second sweeping lip each extend in the direction of the longitudinal axis (longitudinal direction) up to the position of the collector. This allows the sweeping lips to slide or sweep across the segment of the collector as the separating disk rotates relative to the collector about the virtual longitudinal axis. This in turn provides a further advantage when pushing waste or objects on the segment of the collector.

If the separating disk has one or more further edges or edge regions in addition to the first edge or edge region and the second edge or edge region, a lip can also be attached to each of one or more of these further edges or edge regions. This/these lip(s) can each extend in the longitudinal direction up to the position of the collector.

In one embodiment of the separating apparatus, the outer container is rotationally symmetrical in relation to the longitudinal axis.

In one embodiment of the separating apparatus, the separating disk is rotationally symmetrical in relation to the longitudinal axis, except for the region of the cut-out.

In one embodiment of the separating apparatus, the cover/hood is rotationally symmetrical in relation to the longitudinal axis, except for the depositing chute.

In one embodiment of the separating apparatus, a first weight sensor is arranged on the first receiving container. The first weight sensor is designed to determine the weight of the first receiving container when the separating apparatus is positioned such that the longitudinal axis of the outer container is oriented substantially parallel to the gravitational direction and the bottom surface of the outer container is oriented substantially in the direction of the gravitational force.

In one embodiment of the separating apparatus, a second weight sensor is arranged on the second receiving container. The second weight sensor is designed to determine the weight of the second receiving container when the separating apparatus is positioned such that the longitudinal axis of the outer container is oriented substantially parallel to the gravitational direction and the bottom surface of the outer container is oriented substantially in the direction of the gravitational force.

In one embodiment of the separating apparatus, the first and/or the second weight sensor is designed to transmit the measured weight data to a web server.

In a preferred embodiment of the separating apparatus, the receiving containers of the separating apparatus are removable. For this purpose, the outer container can have one or more flaps for removing the receiving containers.

In one embodiment of the separating apparatus, the separating apparatus is mounted with the bottom surface of the outer container on a mobile mount. The mount can be designed to travel autonomously and in particular can be equipped with an on-board collision avoidance sensor system.

A further aspect of the invention relates to an object for multiple use in a recycling system. The object comprises at least one portion made of plastic. The portion made of plastic has a cavity suitable for being closed by welding to a cover made of plastic. The cavity is designed to receive an RFID transponder.

The cover can be made of plastic and is suitable for closing the cavity in the above-described object for multiple use by means of welding. Furthermore, the cover can be made of the same plastic as the portion of the object having the cavity.

In one embodiment of the object, an RFID transponder is located in the cavity, the cavity being welded to the cover.

In one embodiment of the object, the object is an item of reusable tableware. The reusable tableware is, for example, a cup, a mug, a plate, a fork, a knife or a chopstick.

Another aspect of the invention relates to a system for recycling reusable objects. The recycling system comprises at least one of the above-described objects for multiple use, and at least one separating apparatus as described above.

In one embodiment, the recycling system further comprises at least one RFID scanner that can be positioned separately. The RFID scanner is suitable for: detecting RFID transponders; reading the RFID identifier; comparing a read RFID identifier with a set of predefined RFID identifiers; and, upon detection of an RFID identifier corresponding to one in the set of predefined RFID identifiers, triggering a warning signal. The warning signal can be an acoustic signal and/or a visual signal.

LIST OF REFERENCE NUMERALS

- 10 Separating apparatus
- 20 Outer container
- 21 Virtual central axis/longitudinal axis of the outer container
- 22 Bottom surface of the outer container
- 24 Circumferential surface of the outer container
- 26 Opening in the outer container
- 30*a* Receiving container for receiving residual waste
- 30*b* Receiving container for receiving reusable objects
- 32*a*, 32*b* Bottom surface of a receiving container
- 34*a*, 34*b* Circumferential surface of a receiving container
- 36*a*, 36*b* Opening in a receiving container
- 38*a*, 38*b* Edge of a wall of a receiving container
- 39*a*, 39*b* Wall of a receiving container
- 40 Hollow cylinder
- 50 Collector
- 52 Segment of the collector
- 54*a*, 54*b* Edge of the collector in the radial direction, starting from the central axis
- 60 Separating disk
- 62 Cut-out in the separating disk
- 62*a*, 62*b* Edge or edge region of the cut-out in the separating disk
- 63*a*, 63*b* Sweeping lips
- 64 Directions of rotation
- 70 Hood or cover for closing the outer container
- 72 Depositing chute 82 Movement sensor
84 RFID scanner
86 Motor, stepper motor
87 Control electronics system
88 Shaft
90*a*, 90*b* Weight sensor
99*a*, 99*b* Solar panel
110, 120 Holder
130 Rechargeable battery
140 Door/flap
142 Hinge
144 Apparatus for opening and closing
150 Cup
152 Base of the cup
154 Handle
156 Cavity
160 RFID transponder
170 Cover for closing the cavity
x Distance between collector and separating disk
α, β, γ, δ Angle FIG. 1 schematically illustrates one embodiment of a separating apparatus 10 or separating and receiving apparatus 10 according to the invention, which, in this embodiment, is designed as a smart waste container 10 and is shown by means of an exploded view. The waste container 10 comprises an outer container 20, a receiving container 30*a* for residual waste, located inside the outer container 20, and a further receiving container 30*b* for reusable useful objects, such as reusable tableware (cf. FIG. 6 below), located inside the outer container 20. In the embodiment shown, the outer container 20 is in the shape of a hollow cylinder having a circumferential surface 24, the outer container 20 being closed at the bottom by a bottom surface 22 and having an opening 26 at the top. Furthermore, in the outer container 20, a hollow cylinder 40 (not to be confused with the circumferential surface of the outer container 20) is mounted along the central axis 21.

A collector 50 extends from the cylinder 40, above the two receiving containers 30*a*, 30*b* and transverse to the central axis 21 of the outer container 20; in the embodiment shown, said collector consists substantially of a segment 52 in the form of a sector of a circle, the radius of which extends to the inner wall of the outer container 20. In addition to the segment 52, the collector 50 can further comprise mounting elements for attachment to the hollow cylinder 40 and/or the inner wall of the outer container 20 (not shown) since the collector 50 is preferably fixedly mounted in the outer container 20. The collector 50 is used for catching waste (residual waste) and used reusable objects deposited into the waste container 10 from above through the opening 72 in a cover 70 (see below). The edges 54*a*, 54*b* of the segment 52 that extend radially outwardly from the central axis 21 are located above the edge 38*a* or the opening 36*a* in the receiving container 30*a* and above the edge 38*b* or the opening 36*b* in the receiving container 30*b*, respectively.

Figure 3:
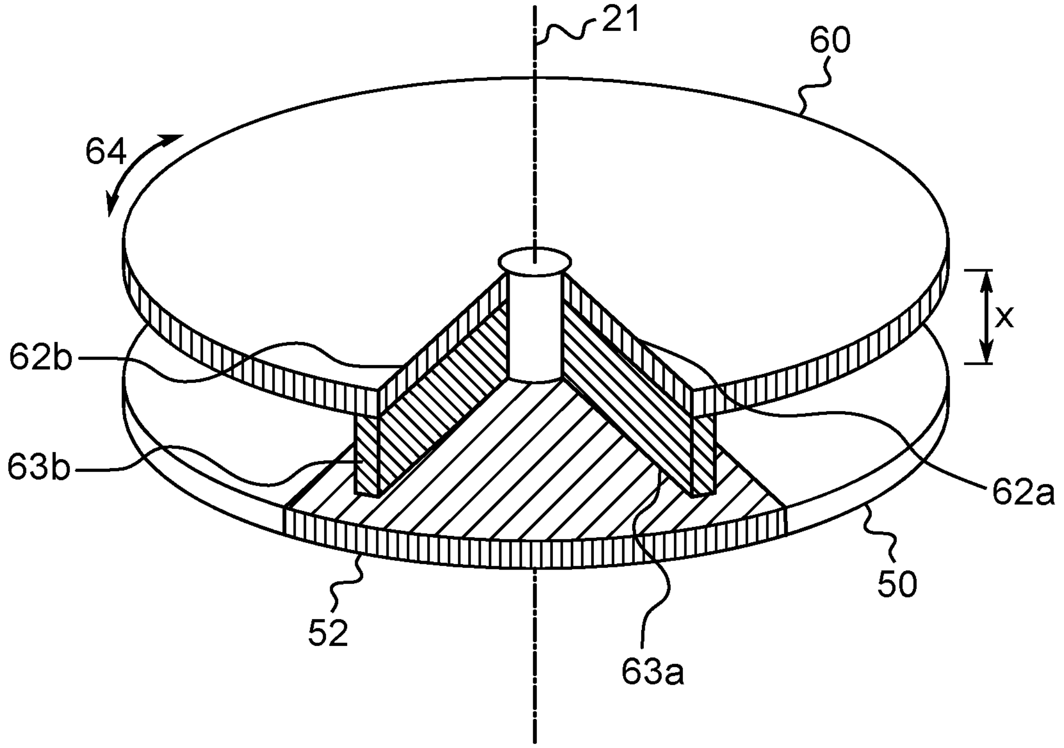
FIG. 3 is a three-dimensional view of a separating disk and a segment of a collector according to one embodiment of the invention.
Figure 4:
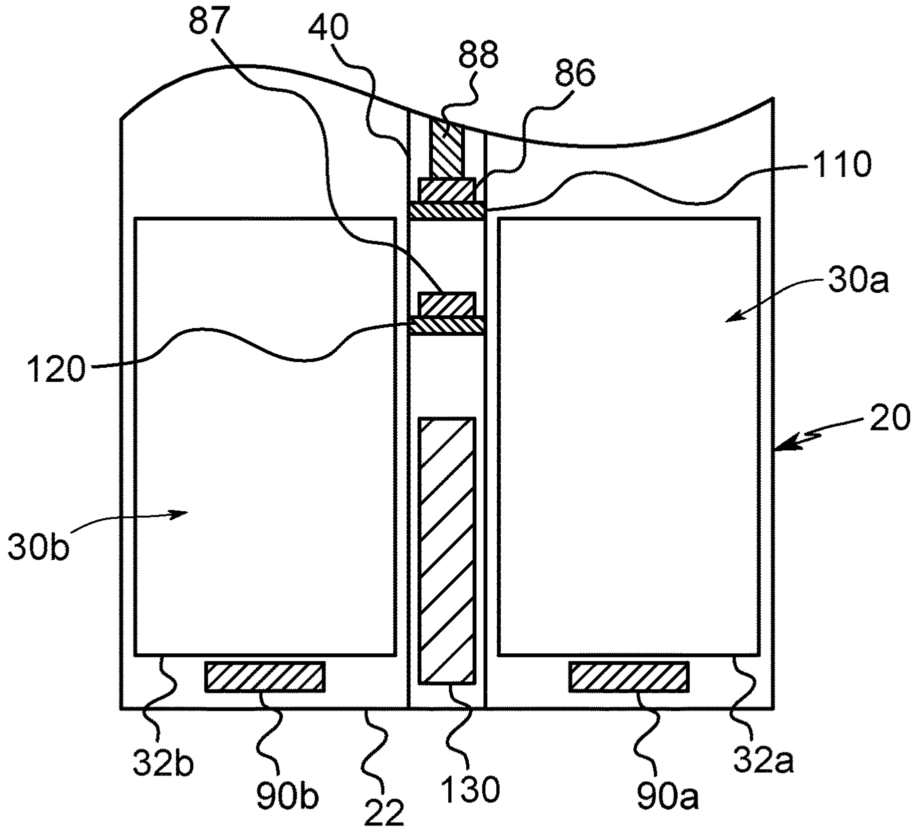
FIG. 4 is a schematic longitudinal section through part of the waste container according to the invention in one embodiment.

Above the collector 50 is a separating disk 60 which is rotatable in both directions of rotation (indicated in the figure by the double arrow 64) about the central axis 21 of the outer container 20, said separating disk being driven by a central-axis stepper motor 86 (see FIG. 4). Except for a cut-out 62, the separating disk 60 is circular and extends transverse to the central axis 21 of the outer container 20 to the inner edge of the outer container 20. In the embodiment shown, the cut-out 62 in the separating disk 60 has a circular sector shape which, in projection in the direction of the central axis 21, is congruent with the segment 52 of the collector 50 (see above). The edges 62*a*, 62*b* of the separating disk 60, which extend radially in relation to the central axis 21 and which at the same time form the radially extending edges of the cut-out 62, have a predefined width (measured in the direction of the central axis 21) and, in embodiments, can be additionally widened (measured in the direction of the central axis 21) by sweeping lips 63*a*, 63*b* (cf. FIG. 3).

In turn, a cover 70 is arranged above the separating disk 60; when the waste container is assembled, said cover completely covers the opening 26 in the outer container 20. In the cover 70, there is a depositing chute 72 for depositing the waste into the waste container 10. The cover 70 is placed on the outer container 20 in such a way that the depositing chute 72 is located directly above the segment 52 of the collector 50. In the exemplary embodiment shown, the depositing chute 72 is, in projection in the direction of the central axis 21, congruent with the shape of the segment 52.

In the shown position of the separating disk 60, the cut-out 62 is located directly and completely above the segment 52 of the collector 50 and below the depositing chute 72 of the cover 70. Therefore, waste deposited into the waste container 10 from above through the depositing chute 72 would, by the force of gravity, fall through the cut-out 62 in the separating disk 60 and be caught by the segment 52 of the collector 50.

In order to achieve automatic separation of the reusable objects that are part of the recycling system from the waste deposited into the waste container 10, the waste container 10 is provided with at least one movement sensor and at least one RFID sensor. FIG. 1 schematically shows the position of a movement sensor 82 at an inner edge of the depositing chute 72 in the cover 70. The movement sensor 82 is designed to detect objects falling through the depositing chute 72 and, upon detecting the same, to transmit a signal (referred to below as a movement signal) to a control electronics system 87 (see FIG. 4). The movement signal can be transmitted to the control electronics system 87 by means of a cable or wirelessly.

Furthermore, FIG. 1 schematically shows the position of an RFID scanner 84 (i.e., an RFID reader) on the separating disk 60. Alternatively, the RFID scanner 84 can also be enclosed within the separating disk 60 and thus not externally visible. The RFID scanner 84 is configured to detect RFID signals originating from an object located on the segment 52, to read the RFID identifier provided by the RFID signal, to compare said RFID identifier with a predefined set of RFID identifiers, and upon detecting an RFID signal having an identifier corresponding to one of the identifiers predefined in the set (i.e., upon identifying particular objects that are part of the recycling system by their respective RFID identifiers; see below), to transmit a signal (referred to below as a detection signal) to the control electronics system 87. The detection signal can, but does not have to, include the identified identifier; it is generally sufficient for the control electronics system 87 to "learn" that any one of the predefined RFID identifiers has been identified.

After triggering of the movement sensor 82 and subsequent identification by the RFID scanner 84—and after receipt of a corresponding movement and detection signal by the control electronics system 87—the control electronics system 87 transmits a signal to the motor 86 such that said motor rotates the separating disk (from the initial position shown in FIG. 1) in the direction (of rotation) in which the edge 62*a* passes, slides or sweeps over the segment 52 of the collector 50 and thus pushes an object located on the segment 52 toward the opening 36*b* in the receiving container 30*b* for reusable useful objects. The signal to the motor 86 can also be simply the application of a voltage to the motor 86, for example a DC voltage. If the edge 62*a* of the separating disk 60 is now guided in particular to the edge 54*b* of the segment 52 (or even slightly beyond), the object tips over the edge 54*b* of the segment 52 by the force of gravity and falls into the receiving container 30*b* provided for reusable useful objects. The control electronics system 87 then controls the motor 86 by means of a suitable signal in such a way that said motor rotates the separating disk back to the initial position. Again, the signal can be, for example, a voltage applied to the motor 86.

However, if the movement sensor 82 is triggered without the RFID scanner 84 subsequently (i.e., within a predefined period of time, such as 0.1 to 3 seconds, from the triggering of the movement sensor) identifying an object that is part of the recycling system, the control electronics system 87 transmits a signal to the motor 86 such that said motor rotates the separating disk 60 (from the initial position shown in FIG. 1) in the direction (of rotation) in which the edge 62*b* passes, slides or sweeps over the segment 52 of the collector 50 and thus pushes an object located on the segment 52 toward the opening 36*a* in the receiving container 30*a* for residual waste. The signal to the motor 86 can also be simply the application of a voltage to the motor 86, for example a DC voltage. If the edge 62*b* of the separating disk 60 is guided in particular to the edge 54*a* of the segment 52 (or even slightly beyond), the object tips over the edge 54*a* of the segment 52 by the force of gravity and falls into the receiving container 30*a* provided for residual waste. Subsequently, the control electronics system 87 controls the motor 86 by means of a suitable signal in such a way that said motor rotates the separating disk 60 back to the initial position. Again, the signal can be, for example, a voltage applied to the motor 86.

The waste container 10 is closed at the top by a hood or a cover 70 having a depositing chute 72; the depositing chute 72 is positioned exactly above the segment 52 of the collector 52 as well as the cut-out 62 in the separating disk 60 when said separating disk is in the initial position shown in FIG. 1.

Figure 2:
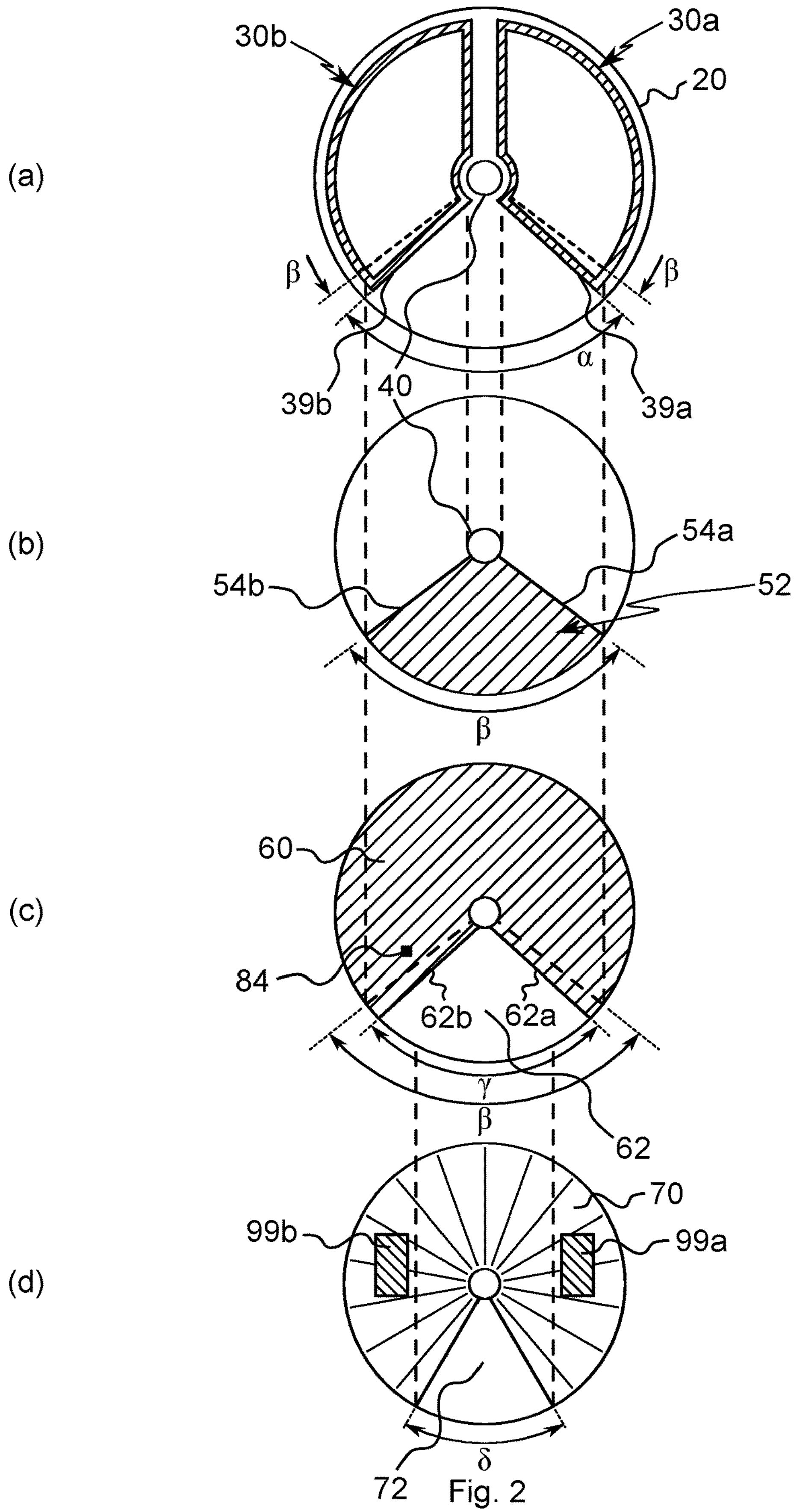
FIG. 2 shows schematic embodiments of the main mechanical components of the waste container according to the invention in section or in plan view.

FIG. 2 schematically shows embodiments of the main mechanical components of the waste container 10 of FIG. 1 in section or in plan view. FIG. 2 (*a*) first shows the rotationally symmetrical outer container 20 in a section through plane A-A as shown in FIG. 1. The receiving containers 30*a* and 30*b* for catching the residual waste and the recyclable objects are arranged in the outer container 20. In section, the receiving containers each have substantially the shape of a circular sector extending from the hollow cylinder 40 to approximately the inner wall of the outer container 20.

The wall 39*a* of the receiving container 30*a*—as shown in FIG. 1—ends at the top at the edge 38*a*. Similarly, the wall 39*b* of the receiving container 30*b*—as shown in FIG. 1—ends at the top at the edge 38*b*. Again, the gap between the edges 38*a* and 38*b* of the receiving containers 30*a*, 30*b* has substantially the shape of a circular sector, which, in the figure, has the angle $\alpha$. The segment 52 of the collector 50 shown in plan view in FIG. 2 (*b*) is arranged directly above (with reference to the orientation of the waste container 10 in FIG. 1) this gap.

Likewise, the segment 52 has substantially the shape of a circular sector; said circular sector generally has an angle $\beta$, which is slightly greater than or equal to the angle $\alpha$. Thus, the segment 52 can be positioned in the waste container 10 such that (with reference to the orientation of the waste container 10 in FIG. 1) the edges 54*a*, 54*b* of the segment 52 are positioned directly above the edges 38*a* and 38*b*, respectively, of the receiving containers 30*a* and 30*b*, respectively (if $\alpha=\beta$) or project slightly beyond the openings 36*a*, 36*b*, respectively, of the receiving containers (if $\alpha<\beta$, as indicated in FIG. 2 (*a*)).

Again, the cut-out 62 in the separating disk 60 is located directly above (with reference to the orientation of the waste container 10 in FIG. 1) the segment 52. FIG. 2 (*c*) is a plan view of the separating disk 60 of the waste container 10 of FIG. 1. The cut-out 62 is also substantially in the shape of a circular sector; said circular sector generally has an angle $\gamma$, which is slightly less than or equal to the angle $\beta$. The reason for this is that the edges 62*a*, 62*b* of the separating disk 60 in the initial position thereof (see FIG. 1) are preferably, at the same time, located on or at least at the corresponding edges 54*a* and 54*b*, respectively, of the segment 52. This prevents the waste from slipping unintentionally into an upside-down receiving container.

Again, the depositing chute 72 of the hood or the cover 70 that closes the waste container 10 is located directly above (with reference to the orientation of the waste container 10 in FIG. 1) the cut-out 62. FIG. 2 (*d*) is a plan view of the hood or the cover 70 of the waste container 10 in FIG. 1. The depositing chute 72 is also substantially in the shape of a circular sector in plan view; said circular sector preferably has an angle $\delta$ that is slightly less than or equal to the angle $\gamma$. The reason for this is that this allows the depositing chute 72 to be positioned completely above (with reference to the orientation of the waste container 10 in FIG. 1) the cut-out 62 when the separating disk 60 is in the initial position. This guarantees that objects deposited through the depositing chute will fall through the cut-out 62 and will not land, for example, on the separating disk 60 next to the cut-out.

Embodiments of the waste container 10 can include a hood or a cover 70, with one or more solar panels 99*a*, 99*b* mounted on the top, as also illustrated schematically in FIG. 2 (*d*). In this way, the entire waste container 10 (circuit board for the control electronics system 87, sensors and stepper motor 86) can be operated completely, or at least largely, autonomously in terms of energy.

FIG. 3 is a three-dimensional view of a separating disk 60 and a segment 52 of a collector 50 according to one embodiment of the invention. The collector 50 and the separating disk 60 are spaced apart from one another at a distance x. Therefore, waste or objects that are lying on the segment 52 and do not reach the height x would not be gathered by the edges 62*a*, 62*b* of the separating disk 60 during a rotational movement 64 thereof and would therefore then also not be "swept" by said edges into one of the receiving containers 30*a*, 30*b* (cf. FIG. 1). Therefore, downwardly pointing "sweeping lips" 63*a*, 63*b* are attached to the edges 62*a* and 62*b*, respectively, of the separating disk 60 of the exemplary embodiment shown in FIG. 3 and extend down to the segment 52. During rotations of the separating disk 60, objects that do not reach the height x would thus also be gathered—due to the sweeping lips 63*a*, 63*b*.

In further embodiments (not shown), said sweeping lips 63*a*, 63*b* can additionally or alternatively also extend upward. This increases the area of the edges 62*a*, 62*b* of the cut-out 62 that "sweep aside" the objects located on the segment 52.

FIG. 4 shows a longitudinal section through the lower part of an embodiment of the waste container 10 according to the invention. The receiving containers 30*a*, 30*b* are arranged within the outer container 20. The receiving container 30*a* for catching residual waste is located with the bottom surface 32*a* thereof on a weight sensor 90*a*, which is positioned between the bottom surface 32*a* of the receiving container 30*a* and the bottom surface 22 of the outer container 20. The weight sensor 90*a* is designed to measure the weight of the receiving container 30*a* for receiving residual waste. Preferably, the weight sensor 90*a* is further designed to transmit the measured weight to a web server or to a computer, smartphones or the like in a local network. This can be done—via a cable or wirelessly—directly from the weight sensor 90*a* or by means of the control electronics system 87. The web server, computer, etc. can then use this to estimate the weight and, in turn, the average fill level of the receiving container 30*a* with residual waste. Similarly, a weight sensor 90*b* is located below the receiving container 30*b*, said weight sensor then being able to measure the weight of the receiving container 30*b* in an exactly equivalent manner and preferably also to transfer said weight, from which the average fill level of the receiving container 30*b* with recyclable objects can then be determined.

The fill level of the two receiving containers 30*a*, 30*b* can thus be constantly checked by means of the weight sensors 99*a*, 99*b* located underneath. In embodiments of the waste container 10, if a predefined weight limit is exceeded, this can then be transmitted to a web server/computer in the local network, etc. via an integrated radio module, and the same applies to other data such as the state of charge of the rechargeable battery 130 and/or the location of the waste container 10 in a predefined area. This data can then be transmitted via the app to smartphones of the organizer's service staff who service the containers on site (emptying the inner separating containers through side doors on the waste container, replacing the rechargeable battery if necessary, returning the dirty items of reusable tableware to a central collection point for cleaning and reintegration into the overall system).

As shown in FIG. 4, the hollow cylinder 40 is located in the center of the outer container 20; in the embodiment shown, the control electronics system (hereinafter also referred to as "electronics system" for short) is housed in said cylinder. In particular, the electronics system can be designed as a single-board solution, such as can be implemented, for example, with the physical computing platform "Arduino". In particular, a stepper motor 86 is located on a holder 110 mounted in the upper region of the cylinder 40. Said stepper motor can transmit a rotary movement to the separating disk 60 via a shaft 88 rigidly connected to the separating disk 60 (not shown in FIG. 4). Suitable chutes or openings (not shown) may have to be made in the wall of the hollow cylinder 40 for the connection between the shaft 80 and the separating disk 60. The control electronics system 87 is located on a further holder 120, which is mounted in the central region of the cylinder 40 in this case. The control electronics 87 system is connected—by means of a cable or wirelessly in each case—to the at least one movement sensor 82 and the at least one RFID scanner 84 and, in certain embodiments, optionally also to the weight sensors 90*a*, 90*b*.

In addition, the electronics system for decoding the RFID identifiers from the RFID signal transmitted by an RFID scanner and/or for evaluating the RFID identifiers by comparison with a set of stored identifiers can also be integrated into the control electronics system 87. Moreover, the control electronics system 87 can of course also be located outside the cylinder 40.

Furthermore, a rechargeable battery 130 can advantageously also be integrated in the cylinder 40 as a power source. In embodiments, said rechargeable battery can be easily replaced through a suitable opening in the base 22 of the outer container 20. A rechargeable battery 130 can be used in addition or as an alternative to solar panels 99*a*, 99*b*, as shown by way of example in FIG. 2 (*d*). In other embodiments, the rechargeable battery 130 can, of course, also be positioned at other suitable locations of the waste container 10.

Figure 5:
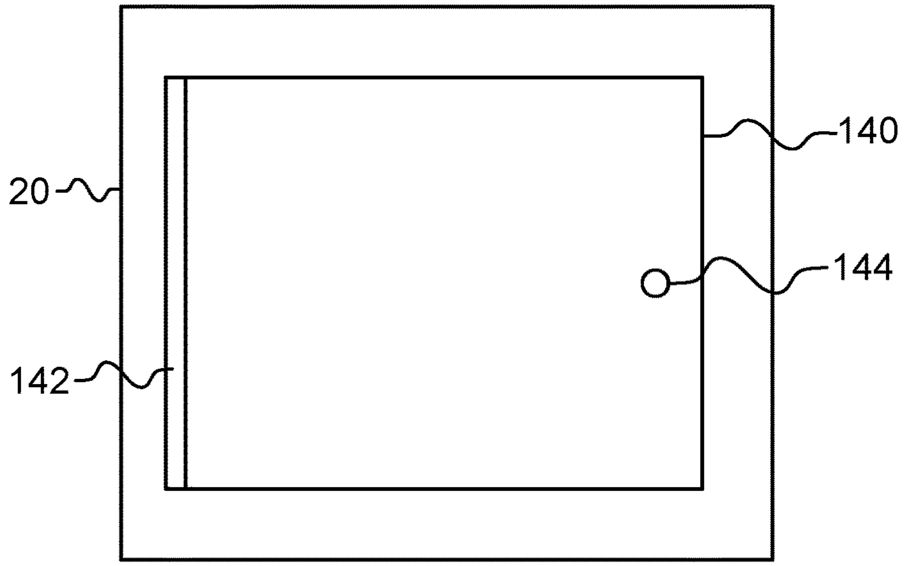
FIG. 5 shows a side view of the outer container in one embodiment of the waste container according to the invention.

FIG. 5 is a side view of the outer container 20 in one embodiment of the waste container 10 according to the invention. In this case, the outer container 20 has a door or flap 140 through which the receiving containers 30*a*, 30*b* can be removed from the outer container 20 and also reinserted. The door or flap 140 can be rotatably attached to the outer container 20 by a hinge 142 and/or have an apparatus 144 for opening and closing, such as a lock, a reach-through opening or a knob. Alternatively, the outer container 20 can also have two doors or flaps, in particular a first flap for removing/inserting the receiving container 30*a* and a second flap for removing/inserting the receiving container 30*b*.

As a further feature, embodiments of the waste container 10 can have colored LED displays (not shown), e.g., in the front region, in particular of the cover 70. These displays can be used to display brief information or even animations, e.g. a "laughing smiley" when a reusable item is deposited, and a "sad smiley" when a conventional disposable item is deposited—this serves effectively as a gamification element and is used to motivate the visitors.

Finally, waste containers 10 can also be equipped with semi-autonomous, mobile mounts. These mounts act as a "mobile base" in which the waste containers are placed. Fixed service points can then be defined in predefined areas, to which the waste containers 10 can move autonomously by means of the mounts and at which said waste containers can be centrally serviced. As soon as a waste container 10 leaves its place, it is preferably replaced immediately by an empty one, which also travels autonomously. The autonomous travel of the mounts is achieved, for example, by means of on-board collision avoidance sensors (radar sensors), and the overall control can be performed via a 5G network and a central server. However, another overall control system that also makes use of other networks, as an alternative or supplement, can also be used.

In the following, embodiments of the reusable objects for use in the recycling system of the invention are described. In this case, the description refers to the case of reusable tableware, by way of example. Embodiments of the reusable tableware according to the invention include a fully recyclable plastic, preferably monoplastic, which is manufactured in the form of beverage cups (with and without lids, removable), food bowls (with and without lids, removable) and other containers. The distinguishing feature of the tableware is passive RFID transponders, by means of which the particular item of tableware can be identified by other components in the overall system (including the waste containers and acceptance machines) and sorted into a special container. The RFID transponders (also referred to as RFID chips or RFID tags below) can operate in the shortwave range (HF—High Frequency) or ultra-short-wave range (USW, UHF—Ultra High Frequency). In particular, the transponder is not permanently bonded/welded to the item of tableware but is located in a cavity made separately during the casting process, said cavity being welded to a cover made of preferably the same (mono)plastic after being fitted with an RFID transponder. After reaching the end of the life cycle of the cup (for example, after about 500 washing cycles), the RFID chip is separated from the remainder again by simply milling open the cavity. The (mono)plastic can be granulated and reused, and the same applies to the electronic RFID chip, resulting in a 100% recycling rate.

Figure 6:
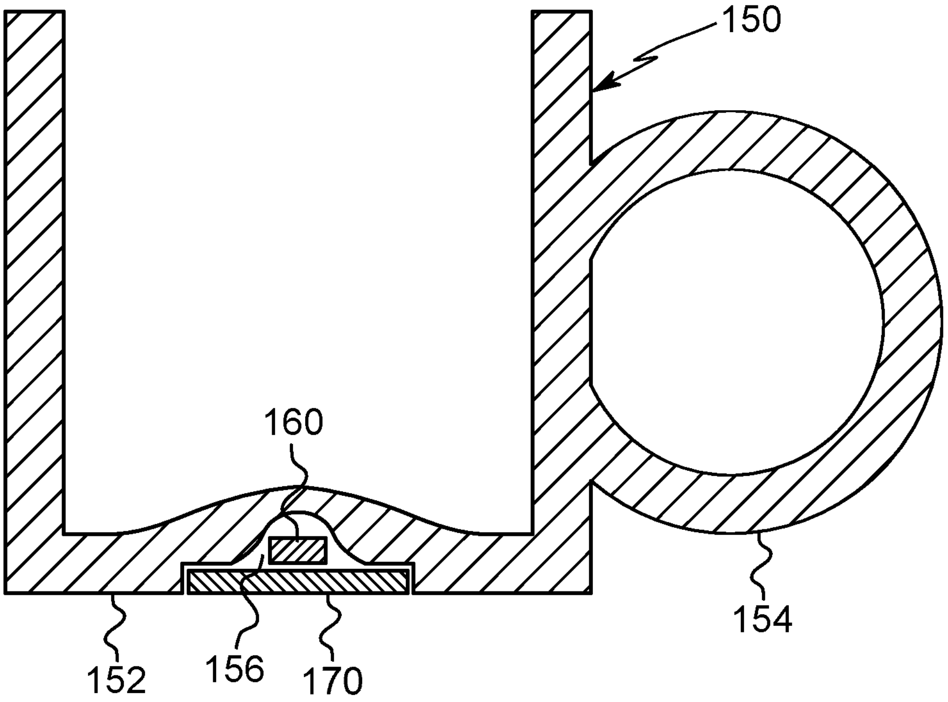
FIG. 6 shows a cross section through an embodiment of a reusable object (cup) according to the invention for use in the recycling system according to the invention.

FIG. 6 shows a longitudinal section through one embodiment of a reusable object according to the invention (with the example of a reusable cup) for use in the recycling system according to the invention. In the base 152 of the cup 150 having a handle 154, there is a cavity 156 suitable for receiving an RFID transponder 160. The RFID transponder 160 is not welded to the cup 150 here. The cavity 156 is also closable by means of a cover 170. In particular, the cup 150 and the cover 170 can be made of plastic; preferably, the cup 150 and the cover 170 are made of the same plastic. Thus, the cover 170 can be placed over the cavity 156, which can then be easily sealed by welding the cover 170 to the base 152 of the cup 150. Of course, other methods for closing the cavity 156 can also be used, many of which can be found in the prior art. Moreover, the above described can be implemented for a plate, a dish, a bowl, cutlery or for any other tableware, instead of a cup.

EXAMPLES

The above disclosure includes the following examples:

1. A separating apparatus (10), in particular a smart waste container, for separating and receiving reusable objects and residual waste, comprising:
   - a first receiving container (30*a*) for receiving residual waste;
   - a second receiving container (30*b*) for receiving labeled objects;
   - a sorting device;
   - wherein the sorting device is designed to detect labeled objects; and
   - wherein the sorting device is further designed to transfer detected objects to the second receiving container (30*b*) and to transfer other objects to the first receiving container (30*a*).

2. The separating apparatus (10) according to Example 1, further comprising:
   - an outer container (20) which, in relation to a virtual longitudinal axis (21) thereof, has a bottom surface (22) transverse to the longitudinal axis, a circumferential surface (24) arranged about the longitudinal axis, and an opening (26) located opposite the bottom surface of the outer container;
   - wherein the first receiving container (30*a*) has a bottom surface (32*a*), a circumferential surface (34*a*), and an opening (36*a*) located opposite the bottom surface of the first receiving container;
   - wherein the second receiving container (30*b*) has a bottom surface (32*b*), a circumferential surface (34*b*), and an opening (36*b*) located opposite the bottom surface of the second receiving container; and
   - wherein the first receiving container (30*a*) and the second receiving container (30*b*) are each arranged or arrangeable within the outer container (20) such that the opening (36*a*) in the first receiving container and the opening (36*b*) in the second receiving container are each oriented toward the opening (26) in the outer container, and the bottom surface (32*a*) of the first receiving container and the bottom surface (32*b*) of the second receiving container are each oriented toward the bottom surface (22) of the outer container.

3. The separating apparatus (10) according to Example 2, wherein the sorting device comprises a collector (50),
   - wherein the collector is arranged, in the direction of the longitudinal axis (21), between the openings (36*a*, 36*b*) in the receiving containers (30*a*, 30*b*) and the opening (26) in the outer container (20),
   - wherein the collector comprises a planar segment (52), the segment extending transversely to the longitudinal direction (21) and being located between the opening (36*a*) in the first receiving container (30*a*) and the opening (36*b*) in the second receiving container (30*b*), as viewed from the bottom surface (22) of the outer container toward the opening (26) in the outer container.

4. The separating apparatus (10) according to Example 2 or 3, wherein the sorting device further comprises a separating disk (60),
   - wherein the separating disk (60) is arranged, in the direction of the longitudinal axis (21), between the collector (50) and the opening (26) in the outer container (20),
   - wherein the separating disk (60) is arranged transverse to the longitudinal axis (21) and is rotatably mounted about the longitudinal axis,
   - wherein the separating disk (60) has a cut-out (62), the shape of which, as viewed in the direction of the longitudinal axis (21), is completely coverable by the shape of the segment (52).

5. The separating apparatus (10) according to any of Examples 2 to 4,
   - wherein the sorting device further comprises at least one movement sensor (82),
   - wherein the at least one movement sensor (82) is designed to:
   - detect a movement in a first predefined region, and
   - upon detection of a movement in the first predefined region, transmit a movement signal to a control electronics system (87);
   - wherein the first predefined region, as viewed from the bottom surface (22) of the outer container (20) toward the opening (26) in the outer container (20), is located behind the segment (52) of the collector (50).

6. The separating apparatus (10) according to Example 5, wherein the sorting device comprises at least one RFID scanner (84),
   - wherein the at least one RFID scanner (84) is designed to:
   - detect RFID signals from a second predefined region,
   - read RFID identifier of the RFID signal,
   - compare the RFID identifier with a set of predefined RFID identifiers, and
   - upon detection of an RFID identifier corresponding to one in the set of predefined RFID identifiers, transmit a detection signal to the control electronics system (84);
   - wherein the second predefined region, as viewed from the bottom surface (22) of the outer container (20) toward the opening (26) in the outer container (20), is located behind the segment (52) of the collector (50).

7. The separating apparatus (10) according to Example 5 or 6, wherein the sorting device further comprises a control electronics system (87) for controlling a motor (86), the control electronics system (87) being designed to:
   - receive a movement signal from the movement sensor (82) and to receive a detection signal from the RFID scanner (84),
   - determine whether a time difference between the reception of a movement signal and the reception of a detection signal is less than a predefined threshold, upon receiving a movement signal and determining that the time difference has exceeded the threshold, transmit a first control signal and then a second control signal to the motor (86), upon receiving a movement signal and determining that the time difference has not exceeded the threshold, transmit a third control signal and then a fourth control signal to the motor (86).

8. The separating apparatus (10) according to any of Examples 5 to 7, wherein the sorting device further comprises a motor (86), the motor (86) being designed to:

upon receiving the first control signal from the control electronics system (87), rotate the separating disk (60) from an initial position in a first direction of rotation about the longitudinal axis (21), and upon receiving the second control signal, to rotate the separating disk (60) back to the initial position, upon receiving the third control signal from the control electronics system (87), rotate the separating disk (60) from the initial position in a second direction of rotation, the second direction of rotation being opposite the first direction of rotation, and upon receiving the fourth control signal, to rotate the separating disk back to the initial position;

wherein the initial position is determined by the cut-out (62) in the separating disk (60) being located above the segment (52) of the collector (50), as viewed along the longitudinal axis (21) from the bottom surface (22) of the outer container (20) toward the opening (26) in the outer container (20); and wherein the first direction of rotation is determined by the cut-out (52) in the separating disk (60) moving toward the opening (36*a*) in the first receiving container (30*a*).

9. The separating apparatus (10) according to any of Examples 2 to 8, further comprising a cover (70) having a depositing chute (72), wherein the opening (26) in the outer container (20) is closed or closable by means of the cover (70);

wherein, in so far as this Example is dependent on Example 3, when the outer container (20) is closed by means of the cover (70), the depositing chute (72) extends behind the segment (52) of the collector (50), as viewed from the bottom surface (22) of the outer container (20) toward the opening (26) in the outer container (20); and wherein, in so far as this Example is dependent on Example 5, at least one of the movement sensors (82) is arranged in the depositing chute (72) and/or the first predefined region comprises at least the interior of said depositing chute (72).

10. The separating apparatus (10) according to any of Examples 4 to 9, wherein the separating disk (60) has a first edge or edge region (62*a*) and a second edge or edge region (62*b*) at the transition to the cut-out (62);

wherein the first edge or edge portion (63*a*) and the second edge or edge portion (62*b*) each extend from an inner region of the separating disk (60) to an outer region of the separating disk (60);

wherein the first edge or edge region (62*a*) is separated from the second edge or edge region (62*b*) by a virtual plane, the plane extending through the cut-out and the virtual longitudinal axis extending within the virtual plane;

wherein a first sweeping lip (63*a*) is attached to the first edge or edge region (62*a*) and a second sweeping lip (63*b*) is attached to the second edge or edge region (62*b*); and wherein the first sweeping lip (63*a*) and the second sweeping lip (63*b*) each extend in the longitudinal direction up to the position of the collector (50).

11. The separating apparatus (10) according to any of Examples 2 to 10, wherein a first weight sensor (90*a*) is arranged on the first receiving container (30*a*), the first weight sensor being designed to determine the weight of the first receiving container when the separating apparatus (10) is positioned such that the longitudinal axis (21) of the outer container (20) is oriented substantially parallel to the gravitational direction and the bottom surface (22) of the outer container (20) is oriented substantially in the direction of the gravitational force; and/or wherein a second weight sensor (90*b*) is arranged on the second receiving container (30*b*), the second weight sensor being designed to determine the weight of the second receiving container (30*b*) when the separating apparatus (10) is positioned such that the longitudinal axis (21) of the outer container (20) is oriented substantially parallel to the gravitational direction and the bottom surface (22) of the outer container (20) is oriented substantially in the direction of the gravitational force; and wherein the first and/or the second weight sensor (90*a*, 90*b*) is designed to transmit the measured weight data to a web server.

12. The separating apparatus (10) according to any of Examples 2 to 11, wherein the separating apparatus (10) is mounted with the bottom surface (22) of the outer container (20) thereof on a mobile mount; and wherein the mount is designed to travel autonomously and is equipped with an on-board collision avoidance sensor system.

13. An object for multiple use in a recycling system, wherein the article has at least a portion made of plastic;

wherein the portion made of plastic has a cavity (156) that is suitable for being closed by welding to a cover (170) made of plastic; and wherein the cavity (156) is designed to receive an RFID transponder (160).

14. A cover (170) made of plastic and suitable for closing the cavity (156) in the object according to Example 13 by means of welding, wherein the cover (170) is made of the same plastic as the portion of the object having the cavity (156).

15. The object according to Example 13, in which an RFID transponder (160) is located in the cavity (156), wherein the cavity (156) is welded to a cover (170) according to Example 14.

16. The object according to Example 13 or 15, wherein the object is a piece of reusable tableware, wherein the reusable tableware is, for example, a cup (150), a mug, a plate, a bowl, a fork, a knife or a chopstick.

17. A recycling system for recycling reusable objects, comprising:

at least one object according to Example 13, 15 or 16; and at least one separating apparatus (10) according to any of Examples 1 to 12.

18. The recycling system according to Example 17, further comprising at least one RFID scanner that can be positioned separately, wherein the RFID scanner is suitable for:

detecting RFID transponders (160), reading the RFID identifier, comparing a read RFID identifier with a set of predefined RFID identifiers, and triggering a warning signal upon detection of an RFID identifier corresponding to one in the set of predefined RFID identifiers;

wherein the warning signal is preferably an acoustic signal and/or a visual signal.

What is claimed is:

1. A separating apparatus that is a smart waste container, for separating and receiving reusable objects and residual waste, the separating apparatus comprising:

a first receiving container for receiving residual waste;

a second receiving container for receiving labeled objects;

a sorting device; and an outer container;

wherein the sorting device is designed to detect labeled objects;

wherein the sorting device is further designed to transfer detected objects to the second receiving container and to transfer other objects to the first receiving container;

wherein the sorting device includes a collector fixedly arranged in the outer container to catch waste and used reusable objects deposited into the separating apparatus from above through an opening in a cover, such that waste or a used reusable object deposited into the separating apparatus directly contacts the collector;

wherein the outer container, in relation to a virtual longitudinal axis thereof, has a bottom surface transverse to the longitudinal axis, a circumferential surface arranged about the longitudinal axis, and an opening located opposite the bottom surface of the outer container;

wherein the first receiving container has a bottom surface, a circumferential surface, and an opening located opposite the bottom surface of the first receiving container;

wherein the second receiving container has a bottom surface, a circumferential surface, and an opening located opposite the bottom surface of the second receiving container; and wherein the first receiving container and the second receiving container are each arranged or arrangeable within the outer container such that the opening in the first receiving container and the opening in the second receiving container are each oriented toward the opening in the outer container, and the bottom surface of the first receiving container and the bottom surface of the second receiving container are each oriented toward the bottom surface of the outer container;

wherein the collector is arranged, in the direction of the longitudinal axis, between the openings in the receiving containers and the opening in the outer container, wherein the collector comprises a planar segment, the segment extending transversely to the longitudinal direction and being located between the opening in the first receiving container and the opening in the second receiving container, as viewed from the bottom surface of the outer container toward the opening in the outer container;

wherein the sorting device further comprises at least one movement sensor, wherein the at least one movement sensor is designed to:

detect a movement in a first predefined region, and upon detection of a movement in the first predefined region, transmit a movement signal to a control electronics system;

wherein the first predefined region, as viewed from the bottom surface of the outer container toward the opening in the outer container, is located behind the segment of the collector;

wherein the sorting device further comprises the control electronics system for controlling a motor, the control electronics system being designed to:

receive a movement signal from the movement sensor and to receive a detection signal from an RFID scanner, determine whether a time difference between the reception of a movement signal and the reception of a detection signal is less than a predefined threshold, upon receiving a movement signal and determining that the time difference has exceeded the threshold, transmit a first control signal and then a second control signal to the motor, upon receiving a movement signal and determining that the time difference has not exceeded the threshold, transmit a third control signal and then a fourth control signal to the motor.

2. The separating apparatus according to claim 1, wherein the sorting device further comprises a separating disk, wherein the separating disk is arranged, in the direction of the longitudinal axis, between the collector and the opening in the outer container, wherein the separating disk is arranged transverse to the longitudinal axis and is rotatably mounted about the longitudinal axis, wherein the separating disk has a cut-out, the shape of which, as viewed in the direction of the longitudinal axis, is completely coverable by the shape of the segment.

3. The separating apparatus according to claim 2, wherein the separating disk has a first edge or edge region and a second edge or edge region at the transition to the cut-out;

wherein the first edge or edge region and the second edge or edge region each extend from an inner region of the separating disk to an outer region of the separating disk;

wherein the first edge or edge region is separated from the second edge or edge region by a virtual plane, the plane extending through the cut-out and the virtual longitudinal axis extending within the virtual plane;

wherein a first sweeping lip is attached to the first edge or edge region and a second sweeping lip is attached to the second edge or edge region; and wherein the first sweeping lip and the second sweeping lip each extend in the longitudinal direction up to the position of the collector.

4. The separating apparatus according to claim 1, wherein the sorting device comprises at least one RFID scanner, wherein the at least one RFID scanner is designed to:

detect RFID signals from a second predefined region, read RFID identifier of the RFID signal, compare the RFID identifier with a set of predefined RFID identifiers, and upon detection of an RFID identifier corresponding to one in the set of predefined RFID identifiers, transmit a detection signal to the control electronics system;

wherein the second predefined region, as viewed from the bottom surface of the outer container toward the opening in the outer container, is located behind the segment of the collector.

5. The separating apparatus according to claim 1, wherein the sorting device further comprises the motor, the motor being designed to:

upon receiving a first control signal from the control electronics system, rotate a separating disk from an initial position in a first direction of rotation about the longitudinal axis, and upon receiving a second control signal, to rotate the separating disk back to the initial position, upon receiving a third control signal from the control electronics system, rotate the separating disk from the initial position in a second direction of rotation, the second direction of rotation being opposite the first direction of rotation, and upon receiving a fourth control signal, to rotate the separating disk back to the initial position;

wherein the initial position is determined by a cut-out in the separating disk being located above the segment of the collector, as viewed along the longitudinal axis from the bottom surface of the outer container toward the opening in the outer container; and wherein the first direction of rotation is determined by the cut-out in the separating disk moving toward the opening in the first receiving container.

6. The separating apparatus according to claim 1, further comprising a cover having a depositing chute, wherein the opening in the outer container is closed or closable by the cover.

7. The separating apparatus according to claim 1, wherein a first weight sensor is arranged on the first receiving container, the first weight sensor being designed to determine the weight of the first receiving container when the separating apparatus is positioned such that the longitudinal axis of the outer container is oriented substantially parallel to the gravitational direction and the bottom surface of the outer container is oriented substantially in the direction of the gravitational force; and/or wherein a second weight sensor is arranged on the second receiving container, the second weight sensor being designed to determine the weight of the second receiving container when the separating apparatus is positioned such that the longitudinal axis of the outer container is oriented substantially parallel to the gravitational direction and the bottom surface of the outer container is oriented substantially in the direction of the gravitational force; and wherein the first and/or the second weight sensor is designed to transmit the measured weight data to a web server.

* * * * *